United States Patent [19]

Berglund

[11] Patent Number: 4,838,686

[45] Date of Patent: Jun. 13, 1989

[54] PROJECTOR APPARATUS

[75] Inventor: Stig Berglund, Stockholm, Sweden

[73] Assignee: Optica Nova ONAB AB, Stockholm, Sweden

[21] Appl. No.: 127,632

[22] Filed: Dec. 2, 1987

[30] Foreign Application Priority Data

Jan. 22, 1987 [SE] Sweden .............................. 8700245
Mar. 30, 1987 [SE] Sweden .............................. 8701304

[51] Int. Cl.⁴ ..................... G03B 21/132; G03B 21/28
[52] U.S. Cl. ................................ 353/98; 353/DIG. 3; 353/77
[58] Field of Search ...................... 353/98, 99, DIG. 3, 353/DIG. 4, 82, 85, 122, 77, 78

[56] References Cited

U.S. PATENT DOCUMENTS 3,752,575  8/1973  Ataka .................. 353/DIG. 6 X
3,770,344 11/1973  Fukushima ............... 353/DIG. 3 X

FOREIGN PATENT DOCUMENTS 3413995 10/1985  Fed. Rep. of Germany .
3443356  5/1986  Fed. Rep. of Germany .
1364060  5/1964  France ................................ 353/99
0060935  5/1980  Japan ........................... 353/DIG. 4
59-192236 10/1984  Japan .
 607652  9/1978  Switzerland .
 525350  8/1940  United Kingdom .................. 353/99

Primary Examiner—Harry N. Haroian
Attorney, Agent, or Firm—Ostrolenk, Faber, Gerb & Soffen

[57] ABSTRACT

Projector apparatus including a light source, a projection head and a projection stage aperture for an object, the image of which is to be produced. The aperture is situated in the ray path between the light source and the projection head. An ellipsoidal mirror is situated in the light path between the light source and the aperture. One focal point of the ellipsoidal mirror substantially coincides with the light source and the other focal point of the mirror substantially coincides with the projection head. The projection head includes a deflection means. The projection head is situated substantially in a plane constituting a normal plane to the aperture plane and containing the front edge line of the aperture, as observed in the generally horizontal projection direction.

8 Claims, 3 Drawing Sheets

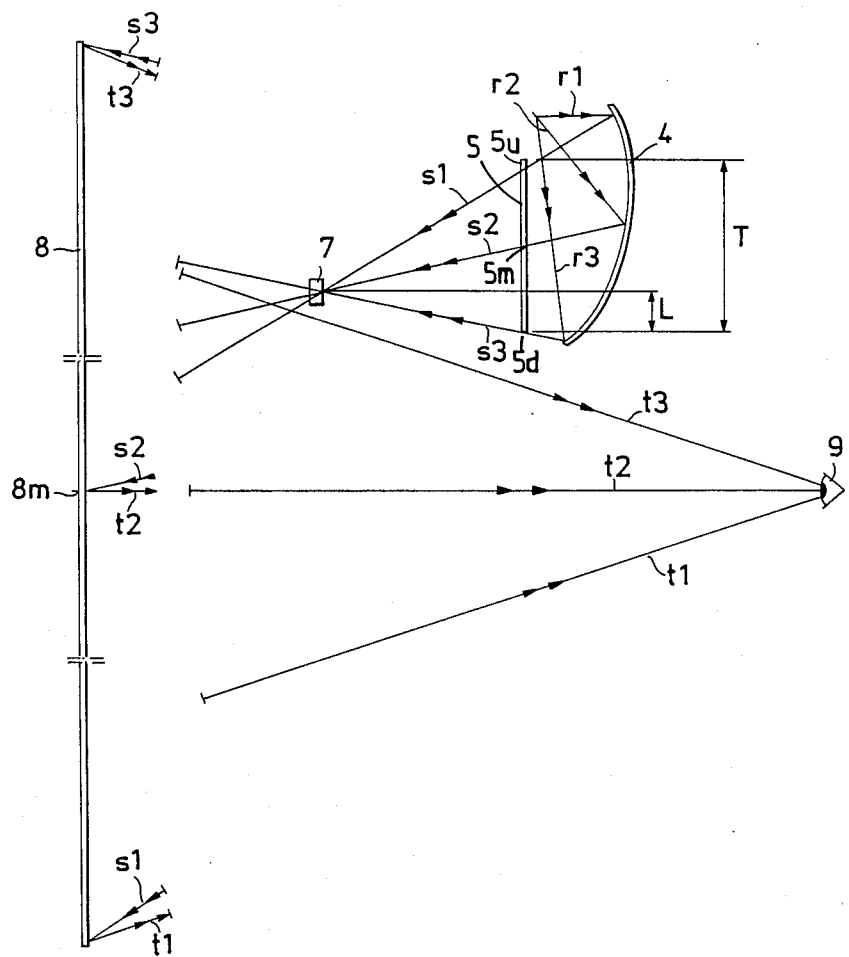

PROJECTOR APPARATUS

BACKGROUND AND SUMMARY OF THE INVENTION

The invention relates to a projector apparatus of the type including a light source and an aperture for an object, the image of which is to be projected, the aperture being placed in the ray path between a projection head and the light source and an ellipsoidal mirror being placed to have its focus points at the light source and the projection head, respectively.

A usual type of overhead projector includes a Fresnel mirror forming the projection stage or aperture for large transparencies, a light source and a projection head being situated centrally above the projection stage at the focal point of the Fresnel mirror.

This type of projector has several disadvantages. The Fresnel structure will be visible in the projected image, and there is further a considerable spread of light in the Fresnel structure which can cause a dazzling effect. In addition, the light must pass twice to the picture carrying material, such as a large transparency, thus emphasizing the effects and impurities in the material with the result that colour reproduction will be poor. The transparency should lie flat on the projection stage, since if there is a space between the material and the mirror there will be doubling effects in the projected image. These doubling effects are the reason why it is not possible to replace the Fresnel mirror with a corresponding concave mirror.

At least some of the above mentioned drawbacks could be mitigated or removed with an overhead projector comprising an ellipsoidal mirror, one focus of which coincides with the optical head and the other focus, of which coincides with the light source. Such a projector is known from CH No. 607 652. But the optical head in the known projector is centered on the aperture or stage of the projector. It is true that it has been suggested, in connection with another type of projector (DE-Al No. 3 443 356) with a lens between optical head and light source, to have the optical head and the light source displaced from central position in order to have the projected image moved upwardly, but the result is discouraging, because the colour errors become significant or unacceptable even for small displacements.

An object of the invention is therefore to provide a projector structure allowing placing of the transparency at a planar aperture for projecting an image substantially without distortion onto a screen parallel, or at right angles to the stage, with the projected image displaced in relation to the stage.

In accordance with the invention, a projector apparatus including a light source, a projection head and an aperture for an object, the image of which is to be projected, the aperture being in the ray path between the light source and the projection head, distinguishes over the prior art in that an ellipsoidal mirror is situated in the ray path between the light source and the projection stage aperture; in that one or a first focal point of the ellipsoidal mirror substantially coincides with the light source; and in that the other or a second focal point of the mirror substantially coincides with the projection head. The proper apparatus is characterized in that the projection head is positioned in a plane, which is orthogonal to the aperture and parallel with a tangent to the periphery of the aperture and in that the distance L between said plane and said tangent is substantially determined by the relation $$0 \leq L \leq T/4$$

where T = the "height" of the aperture.

The surface of the aperture may be oriented substantially horizontally, the projection head being situated at a level above the aperture, the head being equipped with means known per se for deflecting the light into a generally horizontal direction. The projection head advantageously is situated in a plane normal to the aperture plane and containing the rear or forward edge of the aperture, as observed in the generally horizontal projection direction. If the projection head is then situated substantially in a plane constituting a plane normal to the aperture surface and coinciding with the forward edge of the aperture, the deflecting member should be a mirror, since the projector apparatus then functions as a genuine overhead projector, and such that its operator can place a transparency right side up on the aperture surface while he is facing towards the viewers, the image then being projected with a proper orientation for the viewers, on a screen behind the operator. The light source can then be placed in the vicinity of the rear edge of the aperture so that the heat from the light source does not cause discomfort to the operator, and so that the dimension of the ellipsoidal mirror in a direction normal to the aperture plane is minimized. It should also be clear that the light can be deflected in the other direction with a deflecting means in the form of an Amici prism or some other deflecting, image inverting means.

Particularly when the projector apparatus includes deflecting means and the projection stage aperture surface is oriented in a substantially horizontal direction, the apparatus may be arranged for mounting in the vicinity of the ceiling in a room, with the aperture surface substantially parallel to the ceiling surface, the projection head then being at a level just under the aperture surface. It is then possible to arrange that the upper boundary of the projected light is adjacent the ceiling surface. The projection stage aperture may include an image-forming liquid crystal display (LCD) screen so that the apparatus serves the function of a television projector.

It should however be evident that such a television projector may very well be shaped without deflecting means and with the projection stage aperture vertical. The projection lens will then be on a level with the lower border of the aperture.

The aperture can advantageously include a plate of material having light transmission substantially adapted to the intensity distribution of the projection light incident on the aperture such that the light passing the plate has substantially uniform intensity.

The invention has been discussed described above in connection with the use of a single ellipsoidal mirror, placed such that the departing light substantially covers the entire projection stage aperture of the apparatus. It should be clear, however, that instead of using a single ellipsoidal mirror, a plurality of smaller ellipsoidal mirror elements can be placed adjacent each other such that they have their first focal points situated substantially in the projection head, with the second focal points having an associated light source. It will then be clear that a light source can be substantially at the common focal point of several smaller ellipsoidal mirror elements. It will also be understood that such a composite mirror comprising at least two ellipsoidal mirror elements can be given a considerably lesser "height", i.e. dimension in a direction normal to the aperture.

It will be further understood that a projector apparatus in accordance with the invention can readily be arranged for projection with very high light intensity. Optionally, as indicated above, the projector apparatus can also be used as a component in a television projection apparatus with very high light strength. In such a case the light source can optionally be such that its colour can be varied. A method of providing such a light source is to connect light emitting diodes (LED's) of different colours together with the aid of optical fibres, preferably relatively thick plastic fibres. The illumination can then be dynamically adjusted to the momentary colour content of the image for obtaining an increase in the colour range.

BRIEF DESCRIPTION OF THE DRAWINGS

The invention will now be described in the following in the form of an example and with reference to the accompanying drawing, wherein:

FIGS. 5 and 6 illustrate further embodiments of the projector apparatus in accordance with the invention.

DESCRIPTION OF THE PREFERRED EMBODIMENT

Figure 1:
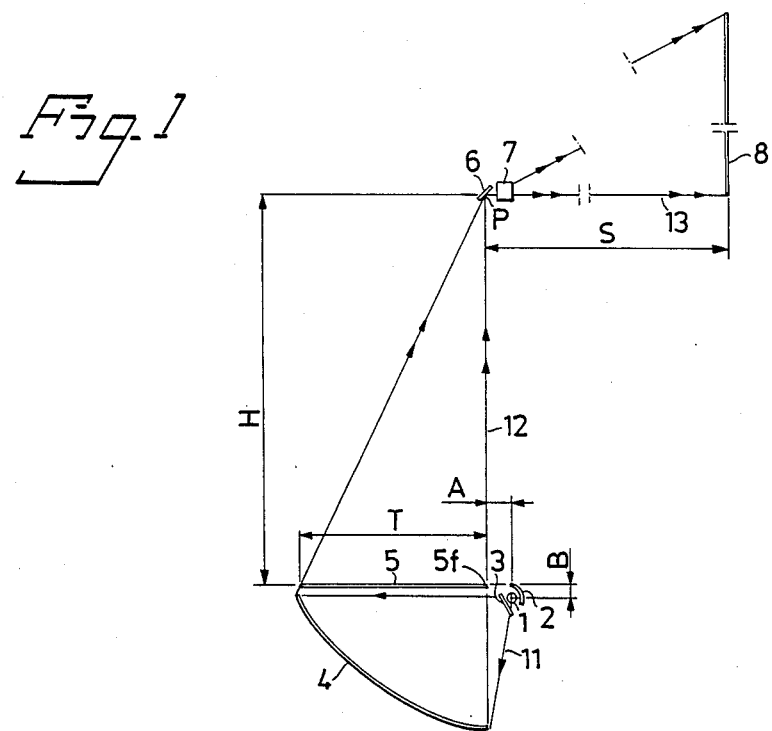
FIG. 1 schematically illustrates a projector apparatus in accordance with the invention.

In FIG. 1 there is illustrated a light source 1 with a lamp reflector 2 and an infra-red (IR) filter 3. An ellipsoidal mirror 4 is situated under a projection stage aperture 5. A light deflecting mirror 6 and an objective 7 are situated above the aperture 5 for projecting an image on the vertical image screen 8. The distance between the horizontal aperture 5 and the projection head 6, 7 is denoted by H. The projection head is situated in a vertical plane containing the front edge of the aperture. The light source 1 is situated at a horizontal distance A in front of the aperture front edge. The vertical distance from the aperture plane down to the light source is denoted by H. The distance between the projection head 6, 7 and screen 8 is denoted by S. The "height" or horizontal extension of the aperture 5 is denoted by T.

Figure 3:
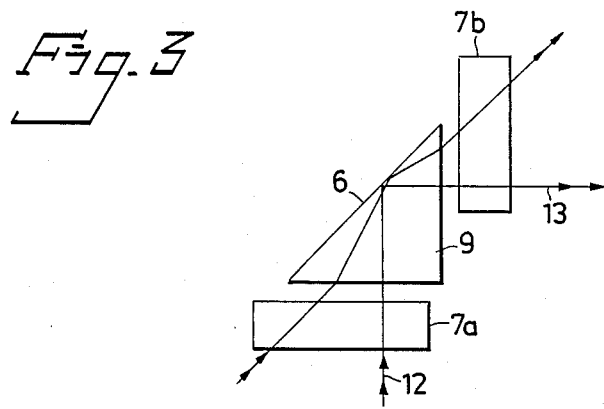
FIG. 3 illustrates a projection head in which the light deflection means is a right-angular prism.

Light going from the light source 1 to the ellipsoidal mirror 4 is denoted by 11; that from the ellipsoidal mirror 4 going to the projection head 6, 7 is denoted by 12; and that from the projection head going to the screen is denoted by 13. The selection of the value of the parameter H can be essentially determined for simple objectives by the magnification desired from the aperture 5 to the screen 8 for a given value of the parameter S, and in such cases the expression $H = S/m$ is substantially applicable, where m = magnification. When deflection is accomplished by a mirror, H must of course be larger than T. However, as in FIG. 3, the mirror can be replaced by a reflecting surface 6 in a prism 9, one form of the objective then comprising a part 7a before, and a part 7b after the prism 9, so that H can be less than T, the total internal reflection of the prism 9 at 6 then being utilized, for example. In addition, it is possible to vary the focal length of the objective, e.g. by varying the distance between the optical elements included in the objective for thus enabling focusing for different distances S. A zoom function can also be incorporated in the objective, it then being possible to vary the size of the image on the screen for a constant distance S. It is possible to allow the IR filter 3, mirror 4 and projection stage aperture 5 to form the walls in a closed box, thus avoiding contamination of the mirror 4, as well as the insides of the IR filter 3 and the aperture 5. A fan can be arranged in connection with the light source 1.

Figure 2:
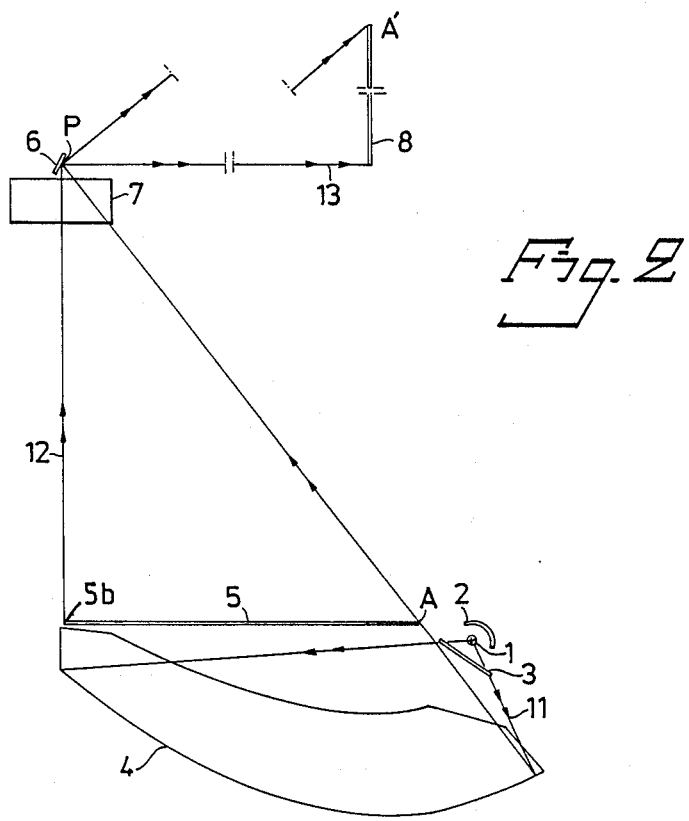
FIG. 2 schematically illustrates an alternative projector apparatus in accordance with the invention.

The embodiment illustrated in FIG. 2 of the projector apparatus corresponds to the one according to FIG. 1, with the exception of the location of the light source 1 and implementation of the deflection means 6. Thus in FIG. 2 the deflection means 6 is an Amici prism oriented for deflecting the light in the other direction in relation to FIG. 1. Furthermore, the light source 1 is situated at the edge of the aperture surface 5 facing away from the edge at which the objective 7 is located. If the projector according to FIG. 2 is to be used for projecting large transparencies, the operator must put the picture upside down if he wants to sit facing towards the public. However, if the projector is only to be used generally as a projector, and without concern for the comfort of the operator, e.g. if the image material is an LCD screen at the aperture 5, such considerations need not be made.

In FIGS. 1 and 2 the projector has been illustrated generally as an overhead projector with a horizontal projection stage aperture 5, e.g. at the level of a table or the like, and with the image screen 8 situated above the aperture 5. However, it should be emphasized that the projector can advantageously be ceiling-mounted with one edge surface 5f of the aperture substantially horizontal and with the objective 7 at a level below the aperture 5, so that the upper boundary of the deflected light can be arranged parallel to a horizontal ceiling surface. Such ceiling mounting of a projector in accordance with the invention can be particularly favourable in lecture rooms or classrooms in schools and the like.

Figure 4:
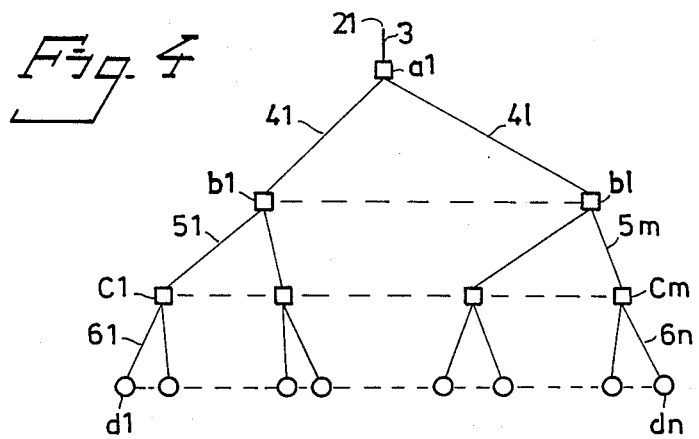
FIG. 4 illustrates a light source for the projector apparatus.

The implementation of a light source which is variable as to its colour is illustrated in FIG. 4. The implementation includes n primary light sources, e.g. LED's in the colours blue, green and red (d1–dn), which are linked in groups via the n optical fibres (61–6n) in the m multiport couplers (c1–cm) into the m optical fibres (51–5m), which are in turn linked in groups in the 1 multiport couplers (b1–bl) in the 1 optical fibres (41–4l), which are all linked together via al into the optical fibre 3, which is terminated by the light opening 21, thus enabling this light opening to constitute the light source 1 in FIGS. 1 and 2.

In the description above, the projector apparatus has been shown to contain a single ellipsoidal mirror 4, which is arranged to illuminate the entire projection stage aperture 5. However, it should be understood that this ellipsoidal mirror 4 can be replaced by two or more ellipsoidal mirrors arranged edge to edge and such that each mirror has a first focal point common with that of the other mirrors, and its second focal point at a light source. In this way it is of course possible to combine this plurality of ellipsoidal mirrors such that they require less space than a single ellipsoidal mirror according t FIGS. 1 and 2.

Figure 5:
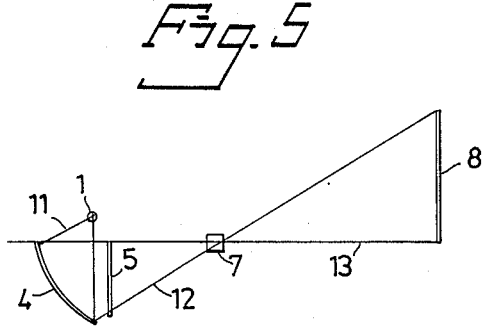

In FIG. 5 there is illustrated a projector apparatus corresponding to the one in FIG. 1, with the exception that it does not have any deflection means, the objective being situated substantially in a plane normal to the aperture plane and containing one edge surface of the aperture.

The aperture 5 is normally substantially rectangular, and its edges substantially rectilinear.

The light source 1 can be arranged at an optional place as long as a first focal point of the mirror 4 is in the projection head, and the light only passes once through the aperture. The locations of the light sources apparent from FIGS. 1 and 2 are to be preferred. The arrangements according to FIGS. 1, 2 and 5 can be symmetrical relative the plane of the drawing. The projector can be ceiling-mounted such that the boundary area of the light 13 which is generally at right angles to the screen 8 is facing upwards.

An advantage with the invention is that a boundary area of the light 13 can be arranged substantially at right angles to the screen 8. When the apparatus is placed on a table or the like, the boundary surface of the light 13 can then be arranged horizontally and facing downwards.

When the apparatus is placed in the overlying position, e.g. against a ceiling, the boundary surface of the light 13 can face upwards and be situated adjacent and parallel to the ceiling surface.

The positioning of the projection head right above the border of the projection stage aperture makes great demands on the projection lens. It is possible to meet with those demands by using aspherical optics and/or by using light sources with small illuminants. It is, however, in certain cases not necessary to position the projection head right above the border of the aperture, but it can be positioned somewhere between right above the border and right above a point directly between the border and the center of the aperture. This is especially the case for projection of images (e.g. TV-images on a LCD display) without deflecting means. In FIG. 6 there is illustrated an apparatus where such a compromise has been done, facilitating the design of the projection lens, without loss in viewing convenience.

The apparatus in FIG. 6 has a shaping similar to the one in FIG. 2, except that there is no deflecting means and that the projection lens 7 is positioned in a plane orthogonal to the projection stage aperture 5 at the distance L from the lower border 5d of the projection stage aperture. The light rays r1, r2 and r3 are reflected against the ellipsoidal mirror 4 into the rays s1, s2 and s3 respectively. The ray s1 penetrates the aperture 5 at its upper border 5u, s2 at its center and s3 at its lower border 5d. The rays s1, s2 and s3 are diffusly reflected against the screen 8 for instance into the rays t1, t2 and t3 respectively and which reach a viewers eye 9 situated approximately at the same height as the center 8m of the screen 8. The distance L is substantially such that $$0 \leq L \leq T/4$$
(1)

where T = the "height" of the projection stage aperture 5.

The projection principle illustrated in FIG. 6 allows viewing the image from the same direction from which it has been recorded, which is of great importance not least for three-dimensional images.

The above described projection apparatuses can generally be said to be shaped such that the projection head 7 is positioned substantially in a plane which is orthogonal to the plane projection stage aperture 5 and parallel with a tangent to the periphery of the aperture. For the distance L between said plane and said tangent the relation (1) holds.

In the inventive apparatus there is an inherent advantage in that the light reflected by the mirror, edge remote from the lamp, has a large depth of field.

In European models of the apparatus H/T is 350/285 mm, whereas in US models H/T is 350/250.

The IR-filter is to advantage curved so that the center of curvature coincides with the filament of the lamp 1. Accordingly, the reflected IR-energy heats the filament and thus reduces the demand for electrical energy for the lamp 1.

Moreover, in many lamps 1 the filament is flat. When the lamp is located near one edge of the mirror and the optical head is located above the opposite edge of the mirror, then the normal to the flat major filament surface should be generally directed towards said opposite mirror edge. In particular, a plane containing the filament major surface should intersect the mirror in the central area thereof, i.e. in the mirror area which illuminates the central area of the aperture or stage.

In a specific embodiment such normal is directed at an angle 16° above a line which extends between the lamp and the said other mirror edge (when the optical lens is above this edge), i.e. the filament surface forms an angle of 106° with said line or rather a plane which comprises said line and which is parallel to the stage. However, it should be appreciated that said angle could be varied, say, +/−30° from 106°, as long as the mentioned effect is attained, i.e. that the illumination of the aperture is evened out.

The reflector can advantageously be a so called cold light reflector, i.e. a reflector which permits transmission, to some degree, of IR wave lengths from the lamp 1.

I claim:
1. Projection apparatus comprising:
   at least one light source;
   at least one ellipsoidal mirror;
   a projection head; and
   a projection stage aperture for an object, the image of which is to be projected, the aperture being placed in the ray path between said at least one light source and the projection head said at least one ellipsoidal mirror being situated in the ray path between said at least one light source and the aperture;
   one focal point of each ellipsoidal mirror substantially coinciding with a light source, the other focal point of each ellipsoidal mirror substantially coinciding with the projection head;
   the projection head being positioned in a plane, which is orthogonal to the aperture and parallel with a tangent to the periphery of the aperture; the distance (L) between said plane and said tangent being substantially determined by the relation

$$0 \leq L \leq T/4$$

where T = the "height of the aperture.
2. Projector apparatus as claimed in claim 1, wherein there is only one ellipsoidal mirror and one light source.
3. Projection apparatus as claimed in claim 1 wherein:
   the surface of the aperture is oriented substantially horizontally; and the projection head includes a means for deflecting the projected light into a generally horizontal direction.

4. Projection apparatus as claimed in claim 1 wherein:
the surface of the aperture is adapted to be oriented substantially vertically in the vicinity of the ceiling in a room for projection against a substantially vertical screen; and
the projection head is substantially on the level with the lower part of the aperture.

5. Projection apparatus as claimed in claim 1 wherein:
the surface of the aperture is adapted to be oriented substantially vertically in the vicinity of the floor in a room for projection against a substantially vertical screen; and
the projection head is substantially on the level with the upper part of the aperture.

6. Projection apparatus as claimed in claim 3, wherein:
the projection head is horizontally positioned next to a foremost border of the aperture in the projection direction;
and the deflecting means constitutes a mirror.

7. Projection apparatus as claimed in claim 3, wherein:
the projection head is positioned next to a back border of the aperture in the projection direction; and
the deflecting means includes an image-inverting means.

8. Projection apparatus as claimed in claim 1, wherein:
the projection stage aperture includes a sheet or plate of material, the light transmission of which is substantially adjusted to the distribution of light from the light source within the visible spectrum, for smoothing out of the light intensity.

* * * * *